United States Patent
Komulainen (10) Patent No.: US 6,311,344 B2
(45) Date of Patent: *Nov. 6, 2001

(54) SAUNA VENTILATION SYSTEM

(76) Inventor: Jorma Komulainen, Haukankaari 10, FIN-70820 Kuopio (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,585

(22) Filed: Sep. 17, 1998

Related U.S. Application Data (63) Continuation of application No. PCT/FI97/00160, filed on Mar. 12, 1997.

(30) Foreign Application Priority Data

| Mar. 18, 1996 | (FI) | 961245 |
| Nov. 13, 1996 | (FI) | 964541 |
| Dec. 2, 1996 | (FI) | 964804 |

(51) Int. Cl.[7] ............................................. A61H 33/06
(52) U.S. Cl. .................................. 4/524; 165/54
(58) Field of Search .................. 4/524; 165/54; 62/90

(56) References Cited

U.S. PATENT DOCUMENTS

| 2,488,333 | * | 11/1949 | Schlachter | 165/54 |
| 3,564,201 | * | 2/1971 | Jones et al. | 165/54 |
| 4,044,772 | * | 8/1977 | Schloss | 4/524 X |
| 4,375,590 | * | 3/1983 | Janson | 4/524 X |
| 4,398,308 | * | 8/1983 | Berg | 4/524 X |
| 5,136,734 | * | 8/1992 | Yli-Kovero | 4/524 |
| 5,546,678 | * | 8/1996 | Dhaemers | 4/524 X |

* cited by examiner

Primary Examiner—Robert M. Fetsuga
(74) Attorney, Agent, or Firm—Pillsbury Winthrop LLP

(57) ABSTRACT

The subject of this invention is a sauna ventilation system which is built into the stove (1) as a single part belonging to it. The ventilation system includes, where required, a heat recovery unit (4), air inlet, circulation, and outlet ducts with ventilators (16 and 21) and air filters (22), outlet and inlet air impellers (17), air humidifier and mixture systems (19 and 20), condensed water removal system (12 and 14) and moisture sensor equipment (15) and operating equipment (3). The sauna fire prevention system is also connected to the stove, which is built into, and integrated with the stove as a single part belonging to it. The fire prevention system includes the fire extinguishing system (59), in which water is directed towards the location of the fire and/or its surrounding area by spray and/or by jet. The integrated system is controlled by the operating, regulating and programming equipment.

8 Claims, 7 Drawing Sheets

SAUNA VENTILATION SYSTEM

This application is a con of PCT/FI97/00160, Mar. 12, 1997.

The subject of this invention is a sauna ventilation system.

The quality of the air in the sauna plays an important role in creating the ideal conditions for enjoying the steam whilst using the sauna. Control over the amount of humidity and oxygen is an important aspect in controlling the quality of the air. Moisture forming whilst the sauna is in use, which does pass to the drain, is also removed by ventilation. The sauna stove is measured according to the individual temperature and bathing conditions for each sauna. The most common temperature range while the sauna is in use is 50–120° C. It should be possible to obtain the right air condition and the desired temperature in a sufficiently short period of time. To do this, the sauna stove has to have a high power rating. This means that the peak power demand placed on the electricity production and distribution facilities arising from the simultaneous use of electric sauna stoves is large during, for example, weekend sauna times. Generally, the ventilation of the sauna and the removal of dampness has to be controlled manually, both while the sauna is in use and whilst being aired. In addition to this, the general air change in the sauna is regulated manually using ventilators to dry out the dampness created during bathing times in between sauna sessions.

Attention to safety of use and fire safety is an important matter. The sauna stove can remain switched on as a result of a malfunction in the equipment. Also, any materials close to the stove may catch fire as a result of misuse. A fire in the sauna can spread rapidly from the sauna room via the doorway or through the ventilation ducts to other areas. It is possible to control a fire situation with existing systems but these systems are independent and external to the sauna stove and are not integrated within the stove itself.

Usually the sauna is heated with a stove fuelled by electricity or wood. There are also stoves which are fuelled by gas and oil. At the same time, there are also stoves available on the market which can be heated with either wood or electricity. Electric stoves are either heat accumulator stoves, which are constantly ready for use and equipped with thermal insulation and ventilators that can be opened, or continuous heating stoves, which are the more common form of electric stove.

The continuous heating electric stove is switched on before the sauna is used and the temperature in the sauna is maintained thermostatically at the desired level while the sauna is in use. The stove operation can also be regulated with a timer or by remote control. Continuous heating stoves are more common than wood-fuelled stoves.

There are also pre-heated stoves in use which are usually heated with combustible fuel and are heated prior to using the sauna but must not be heated whilst the sauna is in use. Pre-heated stoves are further divided between those with a smoke flue and those without. A stove without a smoke flue is used with a smoke sauna.

A problem with the continuous heating electric stove is the large energy demand, especially during the early warning up stage. Ventilation in an electrically heated sauna is often minimised in order to retain the power and energy in the sauna. In particular, saunas in swimming baths and spa baths as well as in saunas kept in general sauna readiness, even 12 hours at a time, the stove is continually switched on throughout the bathing period. In these locations the efficiency of the energy consumption of the sauna is important.

The hot air in the sauna is able to absorb a greater amount of moisture than cold air. When the sauna ventilation is connected directly to, for example, the ventilation ducts of other parts of the building, the moisture condenses on the walls of the ventilation pipes as the air cools in the long ducts. When the pipes become damp the prospects for growth of mould within the air-conditioning system are increased.

A sauna ventilation system, in which the extracted air warms the incoming air by using a heat exchanger is already recognised in publication DE 2602361. This mentions a finned tube heat exchanger whose air extraction cell is connected to the front part of the air outlet duct and the air intake cell between the air inlet duct and the stove. Heat is transferred from the extracted air to the incoming air by a water circulation pipe and pump system. The cells are positioned independently but are connected together by the water circulation pipe system equipped with a heat transfer fitted with fixed or flexible connections. The air outlet channel is also equipped with a duct impeller in this publication.

The system according to publication DE 2602361 requires separate heat recovery and emission cells which are positioned awkwardly in the sauna room, water pipes between the cells, and a pump system to circulate the fluid. Water cannot stand, even temporarily, temperatures well over 100° C. in normal air pressure. In other situations the system has to be constructed in accordance with pressure resistance requirements. With low outdoor temperatures the cell after the air inlet duct can freeze with an obvious danger of water damage.

There are a number of air humidifying systems on the market. A existing system for use in sauna is the humidifier system presented in FI patent 83158, which is built into the stove and in which electricity is used to convert the water to steam in the stove with a separate unit. In the system mentioned the steam is fed along pipes from the lower part of the stove to the upper part and from there out of the stove into the sauna room. A separate water storage tank is attached to this humidifier system, from which water is drawn to be converted into steam in the vaporiser. The problems with this system are calcification and low humidifying effectiveness. In addition, the system is awkward and expensive to build in conjunction with the stove.

It is also known to locate the air humidifier system in the sauna air inlet duct. In this system water is poured from the storage tank in the upper section via the manually adjusted water tap in the pipe to a vaporiser cell made, for example from fabric, in the sauna air inlet duct below. As the air flows through the vaporiser cell in the air inlet duct to the stove air duct or directly into the sauna room it humidifies the sauna air at the same time. The problem with this system is the poor steam production due to the incoming air not being pre-heated. In addition, there are problems in regulating the humidity of the sauna air due to the lack of a control system.

There are generally on the market, various vaporiser tanks which fit in the stone cavity in the stove, the shape of which varies greatly according to the manufacturer. The latest variation in this field is a longish water tank sunk deep into the stone cavity, which is positioned upright in the stove stone cavity. The water contained in the tank is vaporised by the heating source of the stove. In this version the steam comes out of the upper section of the tank. The difficulty with this humidifier is the small quantity of water available for each use. The tank has to be refilled every 15–30 minutes. In addition the tank is difficult to place in stone cavities other than certain known types.

Various vaporiser systems which are external to the sauna room and which bring steam into the sauna room have become known amongst steam sauna systems. These systems are intended solely as steam generating systems for steam saunas and are not suitable in their present form for Finnish type saunas in which the desired temperature is in the range 50° C.–120° C. These systems are expensive to build especially for subsequent installation.

The purpose of this invention is to improve primarily the effectiveness of electrically-heated saunas, but also the ventilation of other saunas, to control the air humidity both during and after use of the sauna and to transfer heat energy from the air extracted from the sauna to the incoming air and to eliminate moisture. At the same time the stove power demand and the condensation occuring in the ventilation ducts can be reduced. In addition, it is the purpose of this invention to introduce a system with which it is possible to prevent a fire starting in the sauna or prevent a fire spreading, and possibly to extinguish a fire in the sauna room as well as to switch off the heating in the event of misuse or equipment defect. A further purpose of the invention is to introduce a system which switches off the heating if the sauna remains unoccupied for a pre-determined period of time after the last user of the sauna.

The purpose of the invention is achieved with systems possessing the characteristics presented in the appended claims.

The air ventilation system is according to the invention attached as a unit to the stove and integral to it. Furthermore the incoming air is arranged to be pre-heated in the heat exchanger by the extracted air so that the average power requirement of the stove can be reduced. The sauna ventilation system also advantageously includes humidifying and after sauna ventilation equipment. The ventilation section removes the moisture in the extracted air before it reaches the air outlet ducts. According to the invention a fire prevention system is built into the stove as an integral part of it and it includes a water spray and/or jet system which is arranged so as to direct moisture towards the location of the fire to be extinguished and/or its surrounding area. In various arrangements of the system it is also equipped with an automatic fire risk reduction and extinguishing function and a system for detecting persons present in the sauna as well as a sauna air humidifier system.

As a peripheral function of the invention, perceptions of sound and light increase the pleasure of being in the sauna. As a whole, it is possible with the invention to also affect the quality of the steam and the after ventilation of the sauna as well as the air humidity conditions. The functions improving user and fire safety also improve user safety and reduce the possibility of possible fires spreading to other areas.

The integrated structure of the stove, ventilation, humidity control and fire prevention system does not essentially take up more floor space than traditional stoves. Separate fluid pipework and pumps for capturing and releasing heat are not required. Neither is an independent fire prevention system required. The integral construction makes it easy to construct a system that is safe and easy to maintain and operate. With the system according to the invention the sauna ventilation, humidity control and heating all operate optimally in the desired manner. The sauna is safe to use and the possibility of fire spreading can be reduced and a fire extinguished.

The power requirement of the stove is reduced as a result of the heat recovery unit according to the invention. The ventilator heat recovery unit can be constructed, for example, such that the power required by the stove is reduced by around 10–15%. In this way the simultaneous electricity production capacity required by, for example, 400,000 stoves is reduced by 280 . . . 420 MW, if the average stove power rating is 7 kW per stove, and none of the stoves has a heat recovery unit and the sauna incoming air is non-preheated external air. The heat recovery unit can also be easily constructed to function with a 15–70% efficiency coefficient.

Where required, a water flow sheet, fixed to the sauna wall and/or to the stove, can be integrated with the combined stove and ventilation system according to the invention, to humidify the air in the sauna. The water flow sheet is divided where required into several sections so that the water forms a vertical surface and whose surface area can be adjusted according to humidity requirements. The water flow sheet attached to the stove or wall also cools the stove or wall that it is attached to. In this way, the surface temperature of the stove can be kept low when in close proximity to heat-sensitive surfaces. In reducing the temperature of the wall surface the heat energy flow through the wall out of the sauna is reduced because the wall temperature is lowered.

Similarly the water surface offers a comparative temperature area which eases the well-being of the sauna users in high steam temperatures. As a result of the heat radiation emitted from the surface, the cooler and damper water surface is felt to be at a different temperature level than other wall surfaces, possibly constructed from wood, which are close to the temperature of the surrounding air.

In the humidity control system according to the invention, the water which has not been vaporised whilst running down the surface is captured in a trough from which it is raised by a pump back to the top of the water flow sheet. It is also possible to connect sauna lighting to the equipment such that the light and water form an element creating an atmospheric feel to the sauna. Where needed the equipment can be fitted with natural sound effects made by the water.

The system comprises a humidity control system either integrated with the stove control, regulation and programming system or built separately. The control system can be used to select the sound, light and air humidity effects. The functioning of the equipment can be formed as pre-regulated operating packages which can be selected according to each persons bathing customs and requirements by selecting the desired pre-programmed function.

The sauna air humidity control system according to the invention controls the moisture content of the air according to the requirements at a given time. The air moisture content is monitored by a moisture sensor in the sauna connected to the regulating system. In addition, the lighting strength can also be regulated. The adjustable lighting is situated in a ventilated space behind the transparent water flow sheet. The sound effects are formed by the water circulated by the pump in the water pipes, ducts, tanks and on the water flow sheet.

The sauna ventilation system, built as part of the stove and/or the integrated humidity control system as well as the safety system according to the invention are simple. The invention improves the air flow in the sauna and pre-heats the incoming air with the extracted air, controls the moisture conditions in the sauna and further assists the safe use of the sauna. As a result of the pre-selected function package the sound, light and humidity functions can be used easily individually or suitably in a selected combined operation.

The invention reduces the power requirement of the stove, saves energy and provides for a sufficient level of fresh air, regulates the uniformity of humidity during use of the sauna and dries the sauna construction after use by ventilation and reduces damage from rot and dampness as well as reducing dampness problems in the ventilation system in other parts of the building. The moisture removal properties of the system make it possible, for example, to dry clothes after use of the sauna.

The system including the fire risk and/or fire sensor built and integrated within the stove, the fire prevention, extinguishing and the persons present sensor, also operates automatically, is simple and easy to use as a result of its operating, controlling and regulating system. This improves the effectiveness of the sauna fire safety and prevents the occurrence of fire damage and saves energy. In addition, the automatic systems according to the invention improve the use of the sauna.

In the following, the invention is defined in more detail with reference to the attached illustrations, in which.

Figure 1:
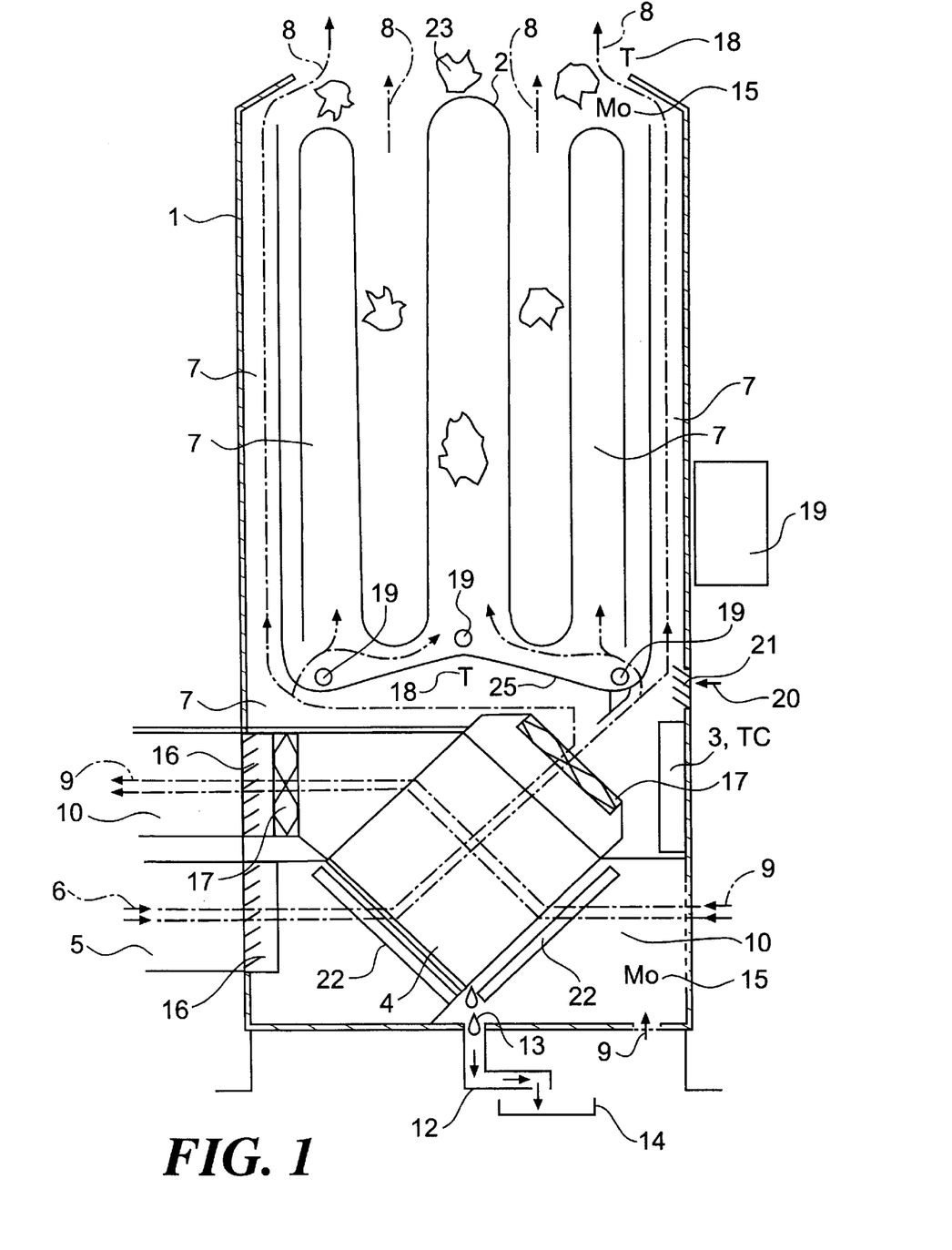
FIG. 1 shows a vertical cross-section of a continually heated electric stove and the ventilation system built into it, viewed from the side.
Figure 2:
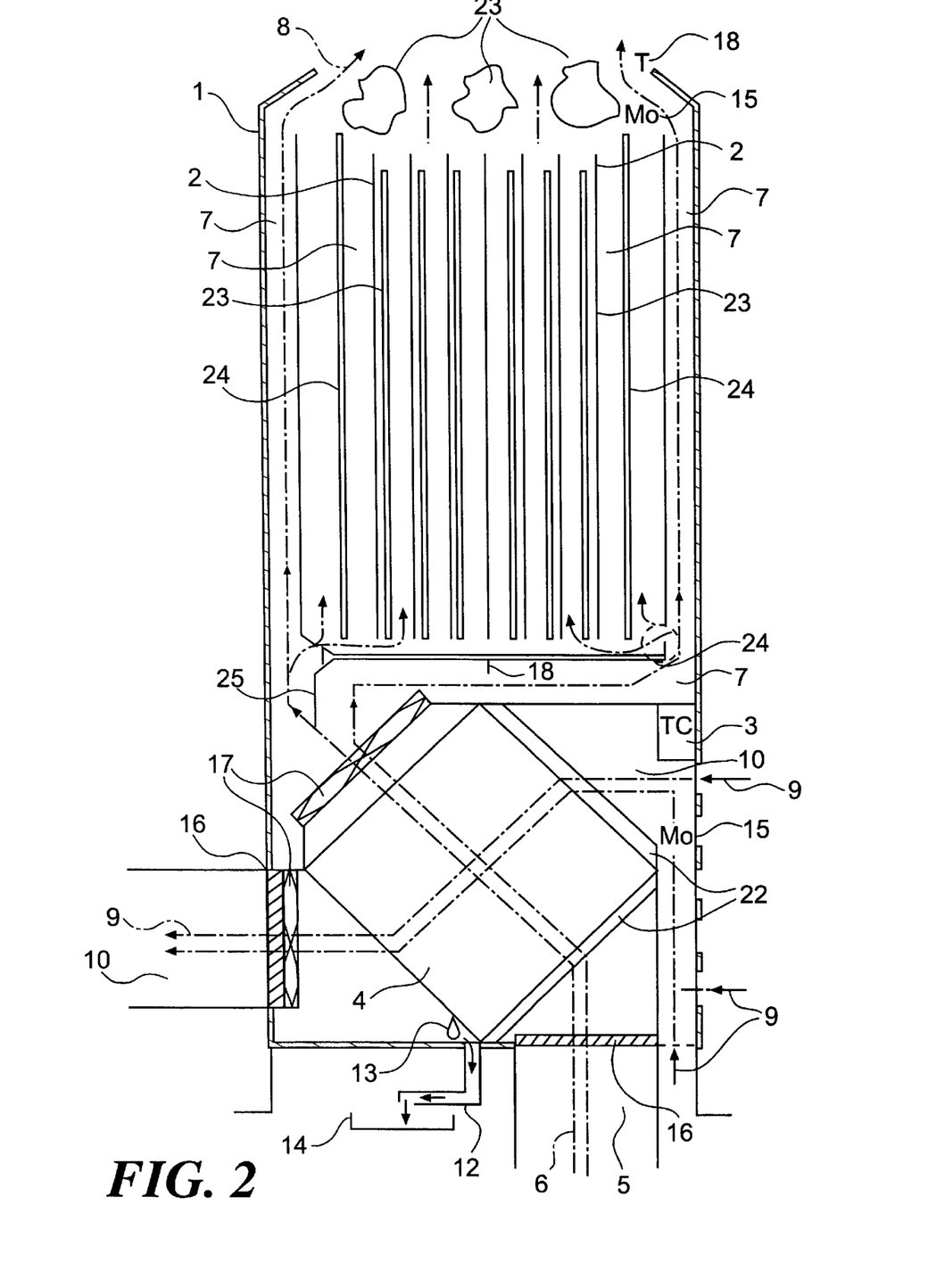
FIG. 2 shows a vertical cross-section of an alternative positioning of the incoming and extracted air combination and a heat accumulator stove, together with the ventilation system built into it, viewed from the side.

Shown in the systems according to FIGS. 1 & 2 are the stove frame 1, heating element 2, the regulation and control unit 3, heat exchanger 4, air inlet duct 5, fresh air 6, side and internal spaces 7, sauna room 8, extracted air 9, air outlet duct 10, water pipe 12, condensed moisture 13, drain well 14, moisture sensor 15, air ventilator 16, extracted and in-coming air impellers 17, thermostat 18, humidifier equipment 19, circulating air 20, ventilator 21, air filtering equipment 22, heat storage mass 23, heat insulation 24 and air and water deflector sheet 25.

The upper part of the system essentially consists of the stove frame 1, the heat storage mass 23, the heat insulation 24, heating elements 2 and with the necessary regulating and control units 3. The heat exchanger 4 is positioned in the lower part of the stove. The air inlet duct 5 for the transfer of fresh air 6 is connected from the wall to the heat exchanger, from which the air is directed via the side and/or inner spaces 7 of the stove to the upper part of the stove and then to the sauna room 8. The incoming air is warned in the heat recovery unit and the upper area of the stove before coming out at a suitable height and mixing further with the hot air stream in the stove and/or above the stove.

The extracted air 9 is taken from the lower part of the sauna room into the heat recovery unit system where the air, after having transferred its heat energy in the heat recovery unit to the incoming air 9, is fed along the air outlet duct 10 to another ventilation system in the building. With this system it is possible to balance the temperature difference in the sauna between the upper and lower parts. Moisture 13 condensed from the extracted air from the sauna pours along the water pipe 12 straight to the sauna room drain well 14. The thermostat 18 controls and monitors the temperature of the stove and the hot air current leaving the stove. The air and water deflector plate 25 directs the pouring steam water for vaporising in the hot air flow in the sauna and with the same equipment air is directed via the under side of the plate to the side and inside areas 7. Where necessary, in order to balance the temperature of the air in the sauna and its humidity and to maintain it as desired, the incoming air is mixed suitably with the circulating air 20. The quantity of circulating air is controlled with the ventilators 21 and their control units.

The moisture sensors 15 control and monitor the humidity whilst the sauna is being used and monitor the after sauna ventilation and drying out period. Based on the moisture data, the air humidifier 19 and circulating air equipment can be suitably regulated whilst the sauna is in use. After the sauna has been in use the after sauna ventilation time is suitably regulated by the air ventilators 16 and the impeller units by means of their operating equipment and regulating unit. The ventilation part can be equipped with the necessary extraction and incoming air impellers 17, if the stove's ventilation system is not connected to the ventilation system of another part of the building but functions as an independent ventilation area. The quantity of circulating air, the ratio of incoming and extracted air and the quantity of circulating air included in the incoming air can be regulated individually according to the needs of each sauna by altering the speed of the extracted and/or incoming air impellers and/or by regulating the incoming and/or extracted air ventilators and circulating air equipment. The ventilation equipment can be fitted with air filtering equipment 22 to remove impurities from the air before it is transferred to the stove and out of the stove.

In a simpler solution the heat recovery unit can be omitted, and the sauna ventilation is regulated by other equipment in a controlled manner but heat cannot be recovered and moisture cannot be removed before the air is led to the ventilation system of another part of the building, or if the sauna operates as its own ventilation area, before the air is let out.

Figure 3:
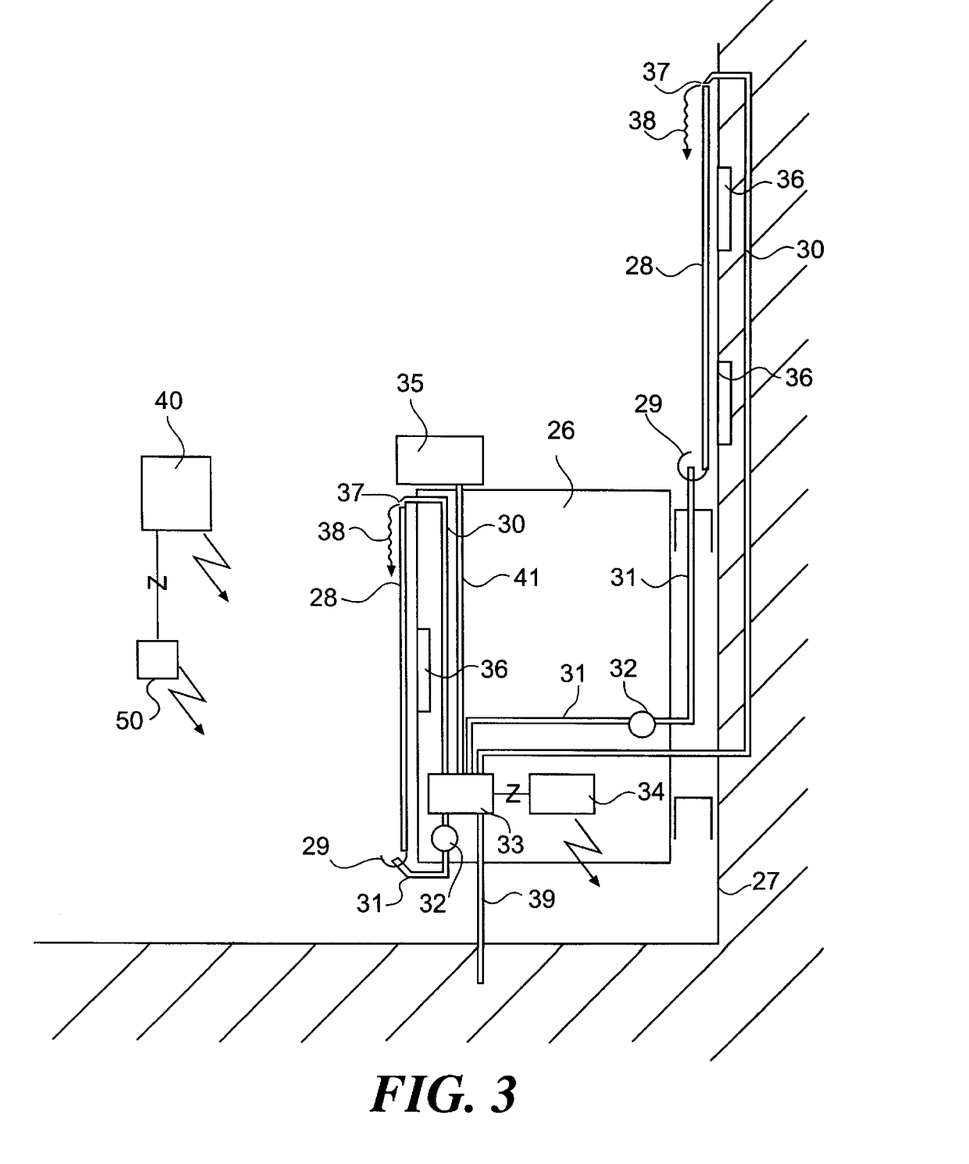
FIG. 3 shows the humidity system of the sauna viewed from the side and a vertical cross-section.
Figure 4:
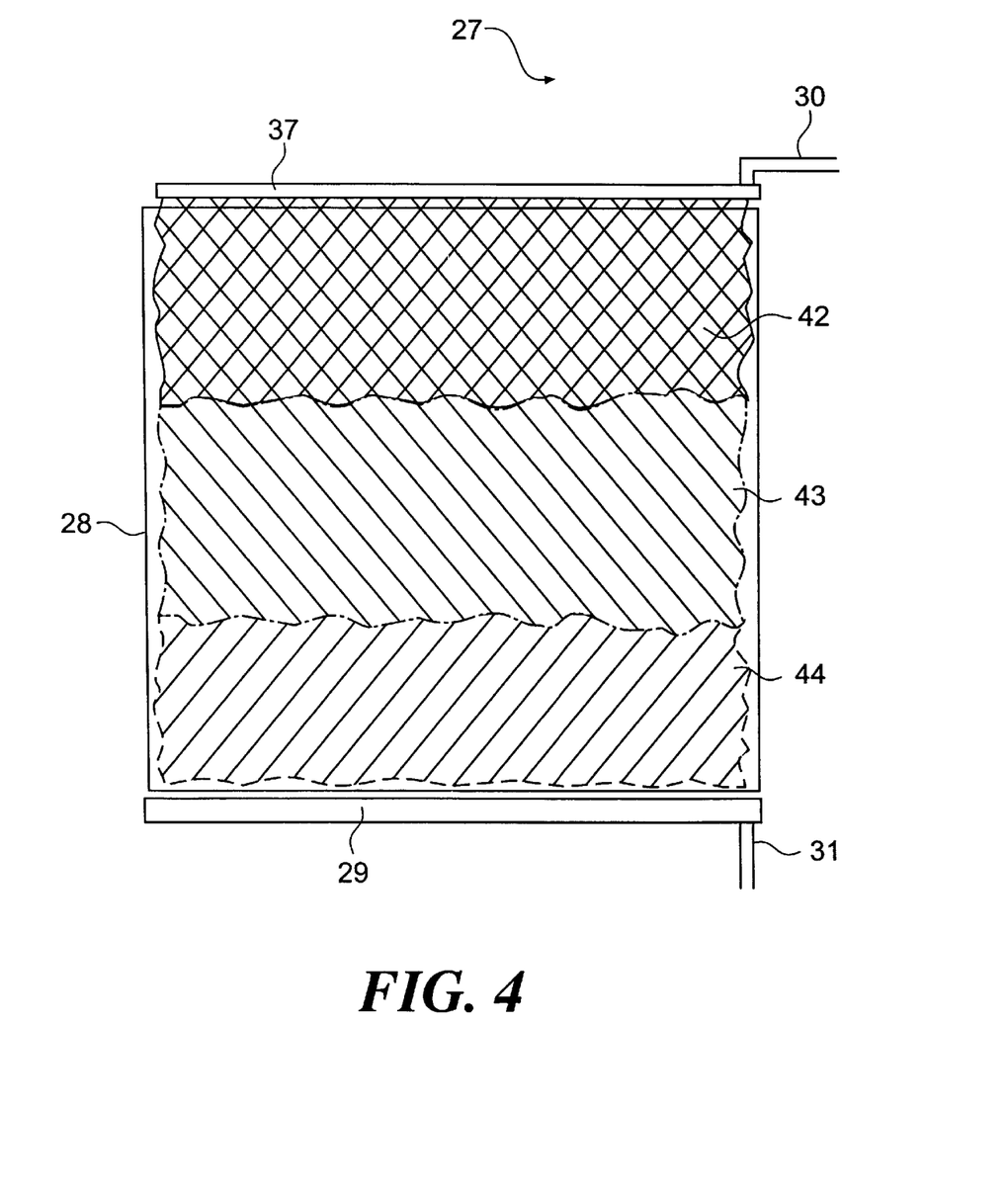
FIG. 4 shows the principle of the water flow sheet and its height adjustment with its various alternatives placed vertically on the wall and stove, viewed from in front of the wall and stove.
Figure 5:
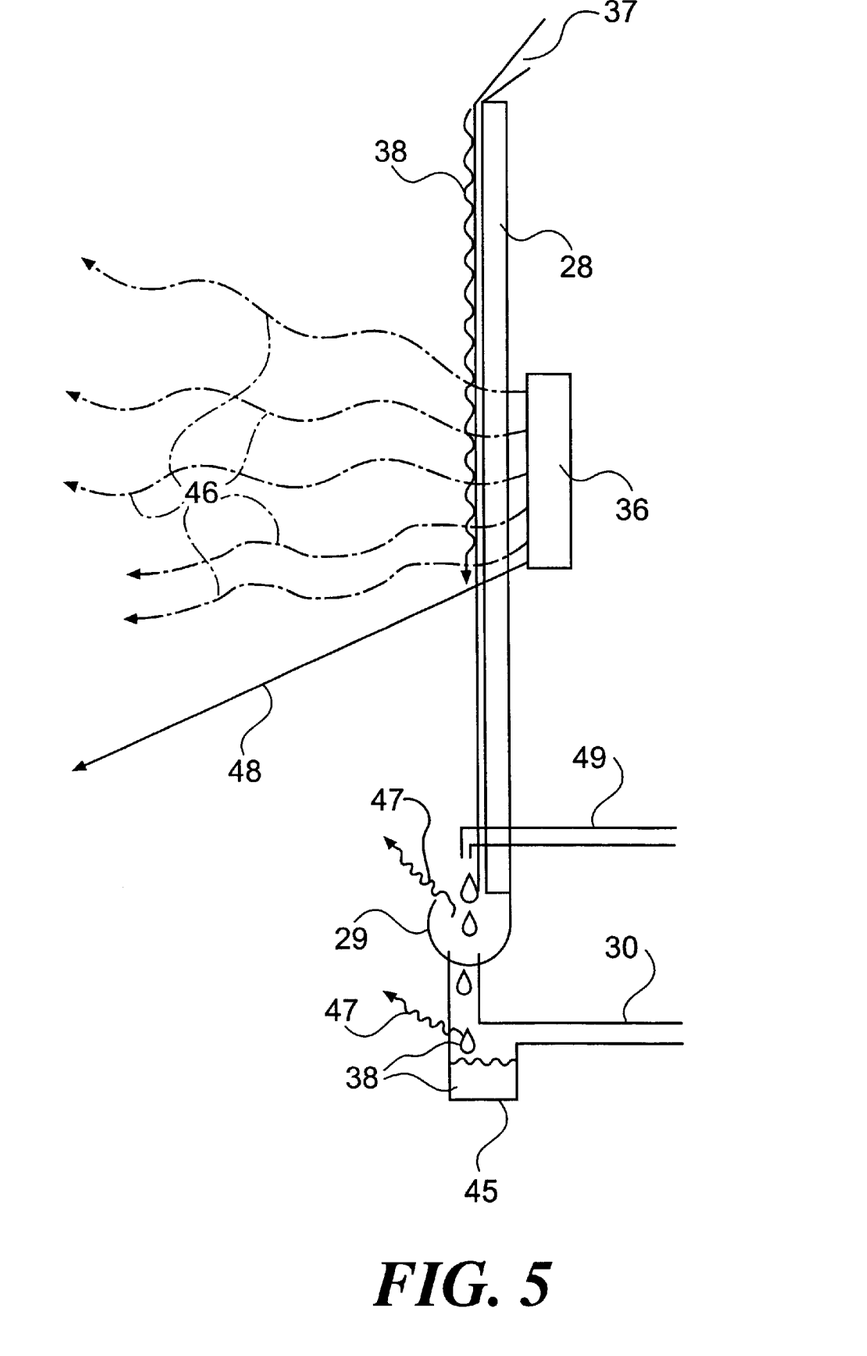
FIG. 5 shows diagrammatically, the location of the auxiliary lighting, sound and moisture effect equipment.

In the system shown in FIGS. 3, 4 and 5 there is shown a stove 26, wall 27, water flow sheet 28, water catchment trough 29, pipes 30 and 31 and 41 and 49, pump 32, distribution centre 33, regulating centre 34, tank 35, lighting 36, jet 37, water 38, water connection 39, control and programming unit 40, areas 42 and 43 and 44, water trough 45 shadows 46, sound 47, light 48 and moisture sensor 50.

The water flow sheet 28 is fixed to the stove 26 and/or the wall 27. Water is poured from the pipes 30 and the jet 37 along the water flow sheet 28. The water 38 runs down the water flow sheet 28 and, at the same time, humidifies the air in the sauna. The water 38 is drawn from the tank 35 along the pipe 41 or from the water connection 39 to the distribution centre 33. The distribution centre 33 also receives water 38 from the water catchment trough 29 which has remained unvapourised on the water flow surface 28 and directed by the pump 32 along the pipe 31. The humidity is controlled by the regulating centre 34 with the sauna air moisture sensor 50. The regulating centre 34 is controlled where necessary with a separate control and programme unit 40. The control and programme unit 40 is programmed beforehand with humidity levels as programme packages which sauna users can select during, before and/or after the sauna session. The lamp 36 lights the sauna room through the surface 28 and the water. A shadow pattern is created in the sauna room due to the water ripples, which varies according to the height of the water and the thickness of the water layer. The lighting is controlled with the regulating unit 34 and/or the control and programme unit 40.

In FIG. 4 the water is brought to the water flow surface 28 along the pipe 30 and with the jet 37. The water flows down the surface 28 from above as far as, for example, area 42, 43 or 44. The larger the area of the surface 28 that is wet from the water the more the sauna air is moistened.

In FIG. 5 the light 36 gives a living and moving light shadow 46 through the water 38 and the water flow surface 28 into the sauna room. When the light goes past the water 38, the light 48 is more even than when flowing through the water. Water dripping from the distribution centre 33 and the pipe 49 into the water spaces 45 provides the sound 47 into the sauna room. The strength of the shadowing 46 of the lighting 36 and the light 48 can be regulated with the control equipment 40 and 34.

Figure 6:
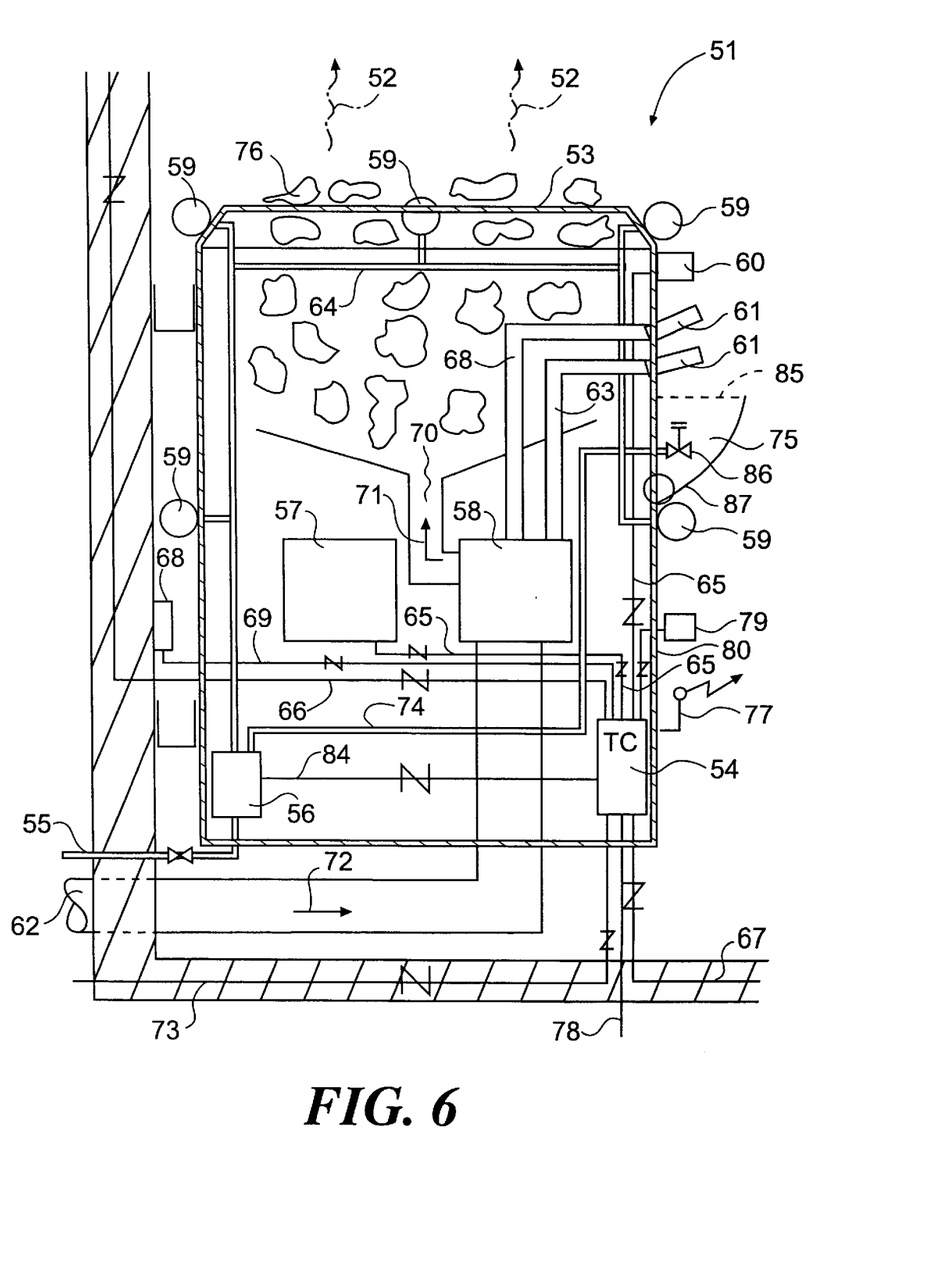
FIG. 6 shows a vertical cross-section of a continually heated electric stove and the fire prevention system built and integrated within it, viewed from the side.
Figure 7:
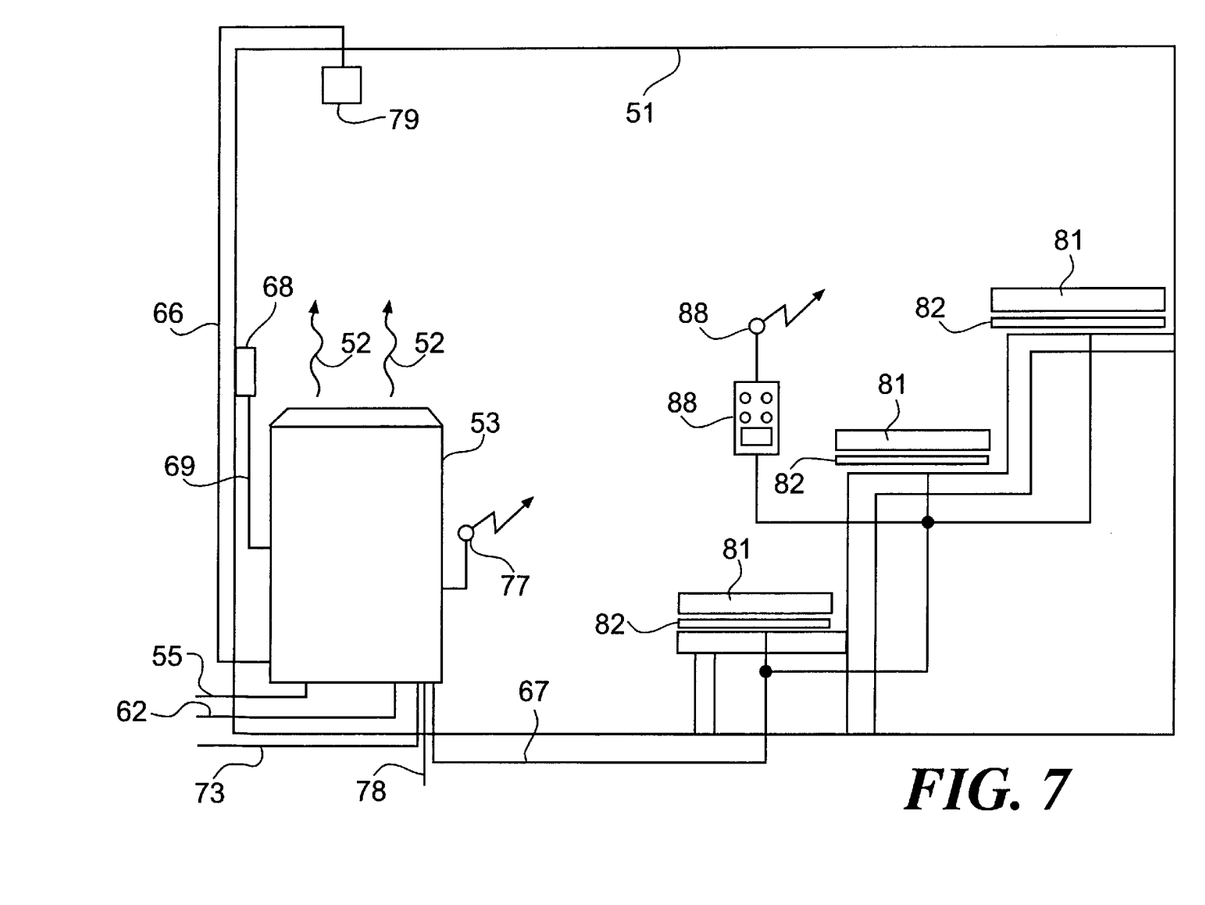
FIG. 7 shows the integrated fire prevention system and its location in the sauna room.

In the system shown in FIGS. 6 and 7 the following reference numbers are used: sauna 51, hot air current 52, stove frame 53, monitoring, regulating and operating unit 54, water connection 55, water regulation unit 56, operating equipment 57, air distribution unit 58, jet 59 and 61, infraswitch 60, air inlet duct 62 duct 63 and 71, pipes 64, cable 65 and 66 and 67 and 69 and 73 and 78 and 84, sensor 68, air flow 70, incoming air 72, pipes 74, steam water tank 75, heat storage mass 76, antenna 77 and 88, smoke detector 79, bench 81, mass recognition sensor 82, control centre 83, bench frame 85, tap arrangement 86 and tilting mechanism 87.

In the arrangement shown in FIGS. 6 and 7 the sauna 51 fire prevention system is built in and integrated within the stove frame 53. The stove is formed from a customary heating system, heat storage mass 76 and the necessary monitoring, regulating and controlling units 54 as well as the operating equipment 57 and 58. The control unit 54 and control centre 83 monitor and guide the sauna operating area and stove heating process controlled by the measuring and peripheral equipment with the help of the operating equipment 57 and the air distribution unit 58. Fire safety is arranged with the fire prevention and extinguishing systems.

The stove monitoring, regulating and controlling centre 54 receives data about the temperature of combustion-sensitive materials from the sensor 68 which is connected by the cable 69 to the centre 54. Also connected to the centre 54 by cable 67 are the sensors 82 attached to the frame 81 of the sauna bench which detect the mass of persons present.

The presence of persons is also monitored with the infraswitch 60 which detects differences in temperature and movement in the area. The infraswitch is connected by cable 65 to the centre 54. If there is no one in the sauna 51 for the period of time programmed into the centre 54 and 83, the centre 54 switches off the stove heating function. Avoiding the stove being switched on unnecessarily saves heat energy.

The smoke detectors 79 are placed in the hot air current 52 areas of the stove, for example, on the ceiling of the sauna and/or the stove, which are also cabled with cable 66 and 80 and/or by radio signal 77 to the centre 54.

The water connection 55 is connected to the stove 53 from which the water regulation unit 56 of the fire prevention system draws the water it requires.

The water regulation unit 56 is connected by cable 84 to the centre 54. The water regulation unit 56 apportions water to the extinguishing jets 59 along the pipework 64. The jets 59 extinguish and/or spray water towards the location of the fire. The steam water tank 75 in the stove is also connected by pipework 74 to the water regulating unit 56. The steam water tank 75 acts, where necessary, as an immediate water supply storage in the event that water is needed for fire prevention operations but the water pressure has dropped in the main pressurised water system and also in the water connection 55. A tap system 86 in the steam water tank 75 automatically maintains the level of the water at a determined height. The steam water tank can be pushed down into the frame of the stove 53 and pulled out when the water is required with the slide and tilt mechanism 87.

When the infraswitch 60, which detects the presence of persons, and the mass detector sensor 82 under the sauna bench 81 on the bench frame 85, have not detected persons using the sauna for the period of time previously programmed into the centre 54 and/or 83, the centre 54 commences to switch off the heating of the stove 53, if the stove 53 had been previously working.

When the sensor 68 connected close to the stove 53, which is connected by the cable 69 to the centre 54, senses the temperature approaching close to the combustion temperature, the centre 54 switches off or lowers the temperature of the stove 53 so that the surrounding temperature drops to a safe level. The function of the sensor 68 is independent of the normal temperature control and over-heating limiting system of a normal electric stove.

If the smoke detector 79 senses the stove's hot air current 52 in the area the centre 54 switches on the extinguishing system 55, 56, 64 and 59 and at the same time switches off the heating of the stove 53. The fire prevention system jet 59 produces a strong water mist and/or a water jet to the predetermined area where the fire is assumed to be.

Data about the function of the sauna fire prevention system is transmitted by the centre 54 along the cable 78 and/or by radio, using cable 67 and the control unit 83 antenna 88 or by the centre 54 antenna 77 to an alarm system outside the sauna and/or to the monitoring and control centre of the building. The warning is transferred to the alarm system when the smoke detector 79 on the sauna ceiling and/or in the stove 53 has sensed smoke and/or combustion gases.

If the air inlet ducts and air outlet ducts are connected directly to the stove 53, then the stove's 53 intake of the incoming air 71 and the outlet of the extracted air can be inhibited by the air distribution unit 58 whilst the fire prevention system is in operation. In this case the effect on heating the area surrounding the stove is reduced and possible point of fire in the sauna does not receive new oxygen from the ducts 71 and 63. The air flow can also be inhibited with various closed flaps which are located directly in the sauna's air inlet and outlet ducts.

The incoming air 72 to the stove 53 flows along the air inlet duct 62. In addition to the normal air flow 71 during sauna use it also possible, whilst the sauna is being used, to direct fresh incoming air towards the occupants in the form of short bursts along duct 63 to the jets 61.

The portions of fresh air from the jets 61 are controlled manually from the remote control centre 83. In this way it is possible to improve the individual conditions for the occupants sitting by an air jet. The system protects and improves the respective occupants well-being during the sauna time and does not essentially disturb the conditions of other occupants in the sauna room at the same time. With this system, if desired, the occupants can sit in the sauna for a longer period of time and do not need to move unnecessarily every now and again to a cooling-off area outside the sauna room. The safety of the occupants is increased.

The smoke detector 79 can be switched off in a fuel-burning stove during the period when the stove is being lit. Also in this situation, when the stove is being lit, the smoke detector 79 activates automatically in a monitoring area. In a fuel-burning stove the heat regulation is carried out by controlling and regulating the respective process and/or combustion process with the operating equipment 57. The operating equipment is connected to the centre 54 by cable 65.

The aforementioned is a descriptive presentation of a basic alternative solution for a fire prevention system built into and integrated within the stove for an electric stove. In addition, consideration has been given in the text to a few essential points concerning the characteristics in connection with a wood-heated stove.

Each fuel system can be equipped with a smoke detector, a surrounding area temperature sensor and a sensor detecting the presence of occupants as well as all or just some of the other presented systems according to each situation.

The fire prevention system can be built together with and integrated within electric and fuel operating stoves. The stove type can be equipped generally with existing equipment according to the fire prevention requirements of each sauna room concerned.

All the systems shown in FIGS. 1–7 can be equipped with the aforementioned and generally known equipment or only with some of them according to the effectiveness required from the use of the sauna and the energy used.

The fire risk and/or fire detector, fire prevention, extinguishing and occupant detector system, according to this invention and built into and integrated within the stove, operate automatically, simply and are easy to use due to the operating, controlling and regulating system. The invention improves the fire safety of the sauna and prevents fire damage as well as saving energy. In addition, the automatic systems according to the invention improve the use of the sauna and increase operating safety.

What is claimed is:

1. A sauna ventilation system in combination with a sauna stove for use in a sauna, wherein the sauna stove comprises:
    a stove frame; and
    a heating element located within the stove frame, wherein the heating element is arranged to heat an inlet flow of air within the sauna stove before the flow of inlet air exits the sauna stove into the sauna,
    wherein the sauna ventilation system comprises:
        an air outlet duct for drawing extracted air from within the sauna;
        an air inlet duct for drawing the inlet flow of air from a source external to the sauna; and
        a heat exchanger operably connected to the inlet duct and the outlet duct, wherein the inlet flow of air is preheated by the extracted air within the heat exchanger prior to the inlet flow of air being heated by the heating element.

2. The sauna ventilation system in combination with a sauna stove according to claim 1, wherein the air outlet duct includes at least one ventilator for drawing the extracted air from within the sauna, and an operating unit for controlling the operation of the at least one ventilator.

3. The sauna ventilation system in combination with a sauna stove according to claim 2, further comprising at least one impeller.

4. The sauna ventilation system in combination with a sauna stove according to claim 1, wherein the air inlet duct includes at least one ventilator for drawing the inlet flow of air from the external source, and an operating unit for controlling the operation of the at least one ventilator.

5. The sauna ventilation system in combination with a sauna stove according to claim 4, further comprising at least one impeller.

6. The sauna ventilation system in combination with a sauna stove according to claim 1, wherein at least a portion of the extracted air is mixed with the inlet flow of air within the heat exchanger.

7. The sauna ventilation system in combination with a sauna stove according to claim 1, further comprising:
    a moisture detection assembly; and
    a control unit for controlling the operation of the sauna ventilation system in response to the moisture detection assembly.

8. The sauna ventilation system in combination with a sauna stove according to claim 7, further comprising:
    a humidifying assembly for supplying moisture to the incoming flow of air in response to moisture detection by the moisture detection assembly.

* * * * *